(12) United States Patent
Doyle

(10) Patent No.: US 9,758,938 B2
(45) Date of Patent: Sep. 12, 2017

(54) LIGHTWEIGHT MODULAR PIER SYSTEM AND A HINGE SYSTEM FOR SAME

(71) Applicant: James Laurence Doyle, Cavan (CA)

(72) Inventor: James Laurence Doyle, Cavan (CA)

(73) Assignee: CIRCLE DYNAMICS INC., Peterborough (CA)

( * ) Notice: Subject to any disclaimer, the term of this patent is extended or adjusted under 35 U.S.C. 154(b) by 0 days.

(21) Appl. No.: 15/070,214

(22) Filed: Mar. 15, 2016

(65) Prior Publication Data

US 2016/0298307 A1 Oct. 13, 2016

Related U.S. Application Data

(60) Provisional application No. 62/144,250, filed on Apr. 7, 2015.

(51) Int. Cl.
*E02B 3/20* (2006.01)
*E02B 3/06* (2006.01)
(Continued)

(52) U.S. Cl.
CPC .............. *E02B 3/06* (2013.01); *E02B 3/068* (2013.01); *F16B 7/1472* (2013.01); *F16B 7/22* (2013.01)

(58) Field of Classification Search
CPC ...................................................... E02B 3/068
(Continued)

(56) References Cited

U.S. PATENT DOCUMENTS 2,618,124 A * 11/1952 Holsten ................... E02B 3/068
405/220
3,074,239 A * 1/1963 Mustard ................... E02B 3/068
14/2.4
(Continued)

OTHER PUBLICATIONS

Solo Dock web page showing Tip-In Dock product, available at http://www.solodock.com/, publication date unknown.

*Primary Examiner* — Frederick L Lagman
(74) *Attorney, Agent, or Firm* — Eric L. Lane; Green Patent Law

(57) ABSTRACT

A modular pier including: a plurality of connectable pier sections wherein each pier section includes a frame having a top, a bottom, at least one transverse frame member, a first transverse end frame member, a second transverse end frame member, a first longitudinal side frame member and a second longitudinal side frame member, at least one longitudinal anti-torsion member, at least one male connector, attached to the first end of the frame of each pier section; and at least one female connector, attached to the second end of the frame of each pier section, the at least one male connector including a first rod member and a second rod member; the second rod member being proximate the first rod member and lower the first rod member in relation to the top of the pier section; the at least one female connector including a first receiver for receiving the first rod member; and a second receiver for receiving the second rod member; the second rod member receiver being proximate the first rod member receiver and lower to the first rod member receiver in relation to the top of the pier section; wherein the first receiver receives the first rod prior to the second receiver receiving the second rod wherein the first rod in the first receiver facilitates maneuvering of the second pier section in relation to the first pier section during assembly and disassembly of the modular pier.

16 Claims, 21 Drawing Sheets

(51) Int. Cl.
*F16B 7/14* (2006.01)
*F16B 7/22* (2006.01)

(58) Field of Classification Search
USPC .............................. 405/218, 219, 220, 221
See application file for complete search history.

(56) References Cited

U.S. PATENT DOCUMENTS

| | | | | |
|---|---|---|---|---|
| 3,421,327 A * | 1/1969 | Donaldson | ............. | E02B 3/068 16/231 |
| 3,686,876 A * | 8/1972 | Muschell | ................ | E02B 3/068 114/71 |
| 4,398,849 A * | 8/1983 | Moran | ................... | E02B 3/068 114/267 |
| 4,645,380 A * | 2/1987 | Hambrick | ............... | E02B 3/068 114/263 |
| 4,948,300 A * | 8/1990 | Bateson | .................. | E02B 3/068 405/220 |
| 5,788,416 A * | 8/1998 | Wolgamot | ............. | E02B 3/068 405/218 |
| 6,217,259 B1 * | 4/2001 | Godbersen | ............. | E02B 3/068 405/218 |
| 6,536,992 B1 * | 3/2003 | Floe | ........................ | E02B 3/068 114/258 |
| 6,695,541 B1 * | 2/2004 | Spence | ................... | E02B 3/068 114/263 |
| 7,241,078 B2 * | 7/2007 | Surges | ...................... | E02B 3/06 14/75 |
| 8,851,798 B1 * | 10/2014 | Jaycox | .................... | F16C 11/04 114/353 |
| 2005/0008437 A1 * | 1/2005 | Surges | ...................... | E02B 3/06 405/218 |
| 2006/0029470 A1 * | 2/2006 | Berlin | ....................... | E02B 3/26 405/4 |
| 2008/0253844 A1 * | 10/2008 | Golden | ................... | E02B 3/068 405/220 |
| 2009/0110487 A1 * | 4/2009 | Hawkins | ................ | E02B 3/068 405/220 |
| 2010/0296874 A1 * | 11/2010 | Woodhouse | ............. | E02C 3/00 405/219 |
| 2011/0044765 A1 * | 2/2011 | Johanneck | .............. | E02B 3/064 405/219 |

* cited by examiner ns and pier section; each of said first and second rod members running substantially parallel to said top of said pier section; said at least one female connector comprising a first receiver for receiving said first rod member; and a second receiver for receiving and locking said second rod member; said second rod member receiver being proximate said first rod member receiver and lower to said first rod member receiver in relation to said top of said shore section and pier section; said first receiver and said second receiver of said shore section shaped for matingly engagement, preferably pivotally engagement, of said first rod member and said second rod member respectively of said first pier section; said first receiver and said second receiver of said first pier section shaped for matingly engagement, preferably pivotally engagement, of said first rod member and said second rod member respectively of said second pier section; wherein said first receiver receives said first rod member prior to said second receiver receiving said second rod member; wherein said first rod in said first receiver facilitates maneuvering of at least one of said first pier section in relation to said shore section and said second pier section in relation to said first pier section during assembly and disassembly of said modular pier; at least one deck panel proximate said top of each of said shore section and said pier sections. Preferably, said at least one longitudinal anti-torsion member is contained within said frame of each of said shore section and said at least one pier section extending between said first transverse end member and said second transverse end member.

In one embodiment, the at least one longitudinal anti-torsion member of said shore section and of said at least one pier section further comprising at least one deck panel connector receiver, preferably at least two deck panel connector receivers; said at least two deck panel connector receivers being spaced apart from each other, for receiving at least one deck panel connector of said at least one deck panel onto the top of said frame; preferably said at least one deck panel receiver is open towards the top of said frame.

Preferably the frame of each shore section and of each of said at least one pier section further comprising: a corner brace on each corner thereof.

Preferably said corner brace comprises two ends, wherein one end of said corner brace is connected to a transverse side frame member and a second end of said corner brace is connected to a longitudinal frame member.# LIGHTWEIGHT MODULAR PIER SYSTEM AND A HINGE SYSTEM FOR SAME

FIELD OF THE DISCLOSURE

The present disclosure relates to a lightweight modular pier system, and more particularly, to a light weight modular pier system with a hinge system facilitating assembly and disassembly thereof with minimal effort.

BACKGROUND

Typical removable piers, proximate bodies of water, and in particular removable piers in regions with cold and icy winters, are removed before ice forms on the bodies of water and replaced after ice no longer forms on the bodies of water. These piers are typically heavy (made of wood, steel and combinations thereof) typically requiring: a) at least two individuals with the strength to lift and maneuver the pier elements into place and assemble/disassemble the pier (usually with pins, retainers, screws and bolts) with the further requirement of tools and b) at least one individual to be in the water during assembly/disassembly. The need of any of pins, retainers, screws and bolts, together with tools may lead to the loss of the pins, retainers, screws, bolts and tools in the body of water. The cold water temperatures and inclement weather conditions during installation and de-installation may further lead to the removal of the pier much earlier than when ice forms on the body of water and installation much later after ice no longer forms on the body of water leading to a shorter season wherein the pier may be used and enjoyed. The need of at least two individuals to install and de-install the pier may also be problematic.

There is a need for a lightweight modular pier system which:
a) may be assembled/disassembled by a single user, and
b) requiring no external hardware.

There is also a need for a hinge system to facilitate assembly and disassembly of piers whether lightweight or not.

SUMMARY

According to one aspect, there is provided a modular pier that may be installed by a user who may be either in or out of the water, said modular pier comprising:
i) a shore section comprising a frame having a shore section top, a shore section bottom, a first shore section transverse end frame member, a second shore section transverse end frame member, a first shore section longitudinal side frame member and a second shore section longitudinal side frame member, at least one shore section longitudinal anti-torsion member substantially parallel to and between said first and second shore section longitudinal side frame members, at least one female connector, preferably a plurality of female connectors, attached to at least one of said first shore section transverse end frame member or said second shore section transverse end frame member;
ii) at least a first pier section, preferably a plurality of connectable pier sections, wherein each pier section comprises a frame having a pier section top, a pier section bottom, a first pier section transverse end frame member, a second pier section transverse end frame member, a first pier section longitudinal side frame member and a second pier section longitudinal side frame member, optionally at least one pier section transverse frame member, preferably at least two pier section transverse frame members, substantially parallel to and between said first and second pier section transverse end frame members, at least one pier section longitudinal anti-torsion member substantially parallel to and between said first and second pier section longitudinal side frame members, at least one male connector, preferably a plurality of male connectors, attached to said first pier section transverse end frame member, and optionally at least one female connector, preferably a plurality of female connectors, attached to at least one of:
a. said second pier section transverse end frame member,
b. said first pier section longitudinal side frame member, said second pier section longitudinal side frame member, and combinations thereof, of each pier section;

said at least one male connector comprising a first rod member or pin and a second rod member or pin; said second rod member being proximate said first rod member and lower said first rod member in relation to said top of said pier section; each of said first and second rod members running substantially parallel to said top of said pier section; said at least one female connector comprising a first receiver for receiving said first rod member; and a second receiver for receiving and locking said second rod member; said second rod member receiver being proximate said first rod member receiver and lower to said first rod member receiver in relation to said top of said shore section and pier section; said first receiver and said second receiver of said shore section shaped for matingly engagement, preferably pivotally engagement, of said first rod member and said second rod member respectively of said first pier section; said first receiver and said second receiver of said first pier section shaped for matingly engagement, preferably pivotally engagement, of said first rod member and said second rod member respectively of said second pier section; wherein said first receiver receives said first rod member prior to said second receiver receiving said second rod member; wherein said first rod in said first receiver facilitates maneuvering of at least one of said first pier section in relation to said shore section and said second pier section in relation to said first pier section during assembly and disassembly of said modular pier; at least one deck panel proximate said top of each of said shore section and said pier sections. Preferably, said at least one longitudinal anti-torsion member is contained within said frame of each of said shore section and said at least one pier section extending between said first transverse end member and said second transverse end member.

In one embodiment, the at least one longitudinal anti-torsion member of said shore section and of said at least one pier section further comprising at least one deck panel connector receiver, preferably at least two deck panel connector receivers; said at least two deck panel connector receivers being spaced apart from each other, for receiving at least one deck panel connector of said at least one deck panel onto the top of said frame; preferably said at least one deck panel receiver is open towards the top of said frame.

Preferably the frame of each shore section and of each of said at least one pier section further comprising: a corner brace on each corner thereof.

Preferably said corner brace comprises two ends, wherein one end of said corner brace is connected to a transverse side frame member and a second end of said corner brace is connected to a longitudinal frame member.

In one embodiment said corner brace is preferably a gusset.

Preferably said second pier section transverse end member comprising at least one pier leg receiver, preferably a plurality of pier leg receivers, for receiving at least one pier leg allowing said pier to be secured on the ground of the body of water and allowing said pier to be above a surface of said body of water. Preferably, said at least one pier leg receiver is proximate at least one corner of said pier section, preferably each corner proximate said second pier section transverse frame end member comprises a pier leg receiver, said pier leg receiver allowing for height adjustment of said pier corner along said pier leg. In one embodiment, said at least one pier leg comprises a top and a bottom, wherein said bottom further comprises a bottom plate, preferably with at least one digging element to dig into the ground of said body of water. In yet a preferred embodiment, said at least one pier leg is square in shape and said at least one leg receiver is square in shape, preferably allowing said at least one pier leg to fit into said at least one pier leg receiver.

Preferably allowing for a slide fit, allowing for enough clearance so a leg may be adjusted even if foreign material such as sand and/or algae is present between the leg and leg receiver.

Preferably the frame of each pier section further comprises: at least one transverse frame member and at least two anti-torsion members; wherein a first end of a first anti-torsion member is connected to said first transverse end member, and a second end of said first anti-torsion member is connected to a first transverse frame member, a first end of a second anti-torsion member is connected to said first transverse frame member, and a second end of said second anti-torsion member is connected to said second transverse end member, said first transverse end member and said second transverse end member defining at least one deck panel receiving section, preferably defining a plurality of deck panel receiving sections; most preferably defining three deck panel receiving sections, for receiving at least one deck panel, preferably a plurality of deck panels, onto said frame of each pier section.

Preferably said at least one deck panel further comprises a deck panel bottom, a deck panel top, a first deck panel end, a second deck panel end, a first deck panel side and a second deck panel side, at least one deck panel connector, preferably at least two deck panel connectors, proximate said deck panel bottom, for connecting to said deck panel receiving sections of each of said shore section and said pier sections. Preferably said at least one deck panel further comprises a deck panel longitudinal member substantially parallel to and between said first and second deck panel sides. More preferably, said at least one deck panel connector, preferably said at least two deck panel connectors are situated on said deck panel longitudinal member.

In one embodiment, said top of each deck panel further comprises at least one elongated surface strip, preferably a plurality of spaced apart elongated surface strips, preferably of aluminum, more preferably of wood, even more preferably of wood veneer on aluminum, and combinations thereof. Preferably said at least one surface strip is substantially anti-slip.

Preferably said at least one deck panel connector is cylindrical in shape, preferably tapered at one end thereof, more preferably tapered at one end distant the bottom of said at least one deck panel. Said at least one deck panel connector being axially normal to said bottom of said at least one deck panel. More preferably said at least one deck panel further comprising a second deck panel connector, distant said at least one deck panel connector. Preferably, said at least second deck panel connector is cylindrical in shape, more preferably cylindrical in shape having at least two diameters, wherein a first diameter is greater than a second diameter, said second diameter being proximate the top of said at least one panel. Preferably said at least second deck panel connector being axially normal to said bottom of said at least one deck panel.

Preferably one of said at least two deck panel connector receivers is configured to matingly receive said at least one deck panel connector cylindrical in shape, preferably cylindrical and tapered in shape and said second of said at least two deck panel connector receivers is configured to matingly receive said at least second deck panel connector cylindrical in shape, preferably cylindrical in shape having at least two diameters, to matingly secure said deck panel with said top of said pier section. More preferably, the first diameter of said second deck panel connector receiver receives said first and second diameter of said at least second deck panel connector and said second diameter of said second deck panel connector receiver securely engages said second deck panel connector and allows for said first deck panel connector receiver to receive said first deck panel connector, securing said deck panel in place.

According to yet another embodiment, there is provided a hinge system, for connecting:
  i) a shore section and at least one pier section; and optionally
  ii) at least one pier section with at least another pier section; said hinge system comprising:
    a) at least one male connector; and
    b) at least one female connector;
    wherein when connecting a shore section with at least one pier section, said at least one male connector is on said at least one pier section, and said at least one female connector is on said shore section; and wherein when connecting a least one pier section with at least another pier section, said at least one male connector is on said at least another pier section, and said at least one female connector is on said at least one pier section; said at least one male connector further comprising a first rod member or pin and a second rod member or pin; said second rod member being proximate said first rod member and lower said first rod member in relation to a top of a shore section and pier section; each of said first and second rod member running substantially parallel to said top of said pier section; said at least one female connector comprising a first receiver for receiving said first rod member; and a second receiver for receiving and locking said second rod member, said second rod member receiver being proximate said first rod member receiver and lower to said first rod member receiver; said first receiver and said second receiver of said shore section/at least one pier section shaped for matingly engagement, preferably pivotally engagement, of said first rod member and said second rod member respectively of at least one pier section/at least another pier section; wherein said first receiver receives said first rod member prior to said second receiver receiving said second rod member wherein said first rod in said first receiver facilitates maneuvering of said first pier section in relation to said shore section and said second pier section in relation to said first pier section during assembly and disassembly of said modular pier.

According to yet another embodiment, there is provided a process of installing a modular pier as described herein, said process comprising:
i) securing a shore section as described herein to a shore; said shore section having at least one female connector distant said shore;
ii) securing at least a first deck panel as described herein to said shore section
iii) connecting at least a first leg, preferably at least two legs, to a leg receiver of a first pier section as described herein;
iv) connecting said at least first pier section having at least one male connector, to said at least one female connector of said shore section, in horizontal alignment;
v) securing at least a first deck panel as described herein to said at least first pier section; and optionally
vi) connecting at least a first leg, preferably at least two legs, to a leg receiver of a second pier section as described herein;
vii) connecting said second pier section to said at least first pier section; and
viii) securing at least a first deck panel as described herein to said at least second pier section.

DETAILED DESCRIPTION

Figure 1:
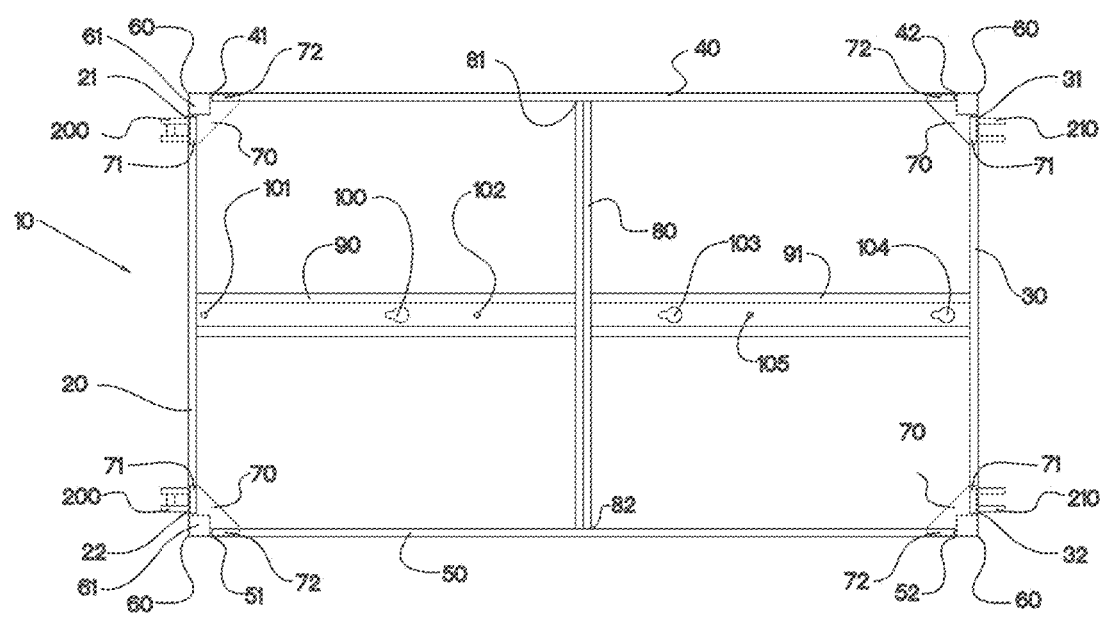
FIG. 1 is a top view of a pier section according to one embodiment
Figure 2:
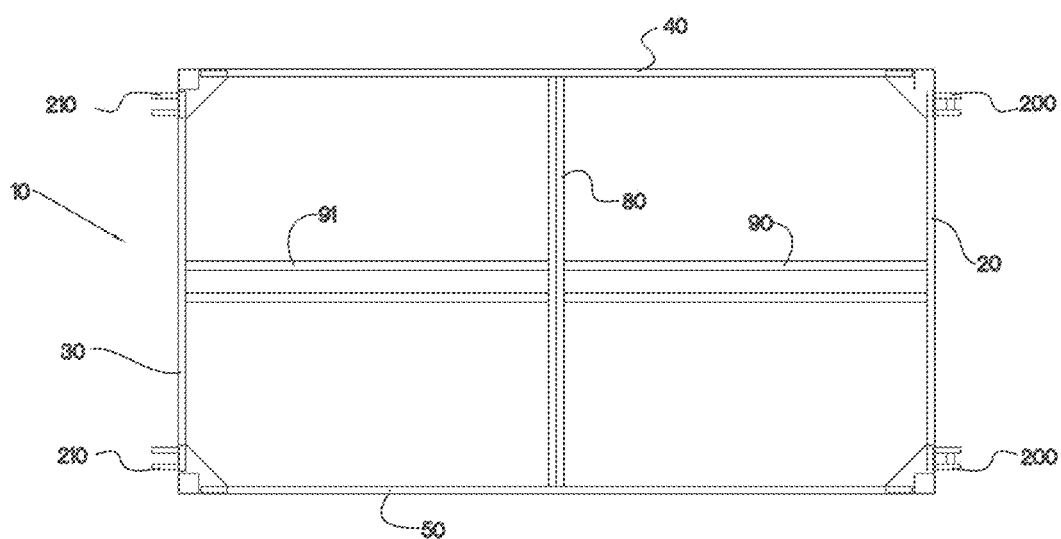
FIG. 2 is a bottom view of the pier section of FIG. 1

Referring now to FIGS. 1-4, a pier section 10 according to one embodiment is depicted. The pier section 10 has a first transverse frame end member 20, a second transverse frame end member 30, a first longitudinal side member 40 and a second longitudinal side frame member 50. The first transverse frame end member 20 has a first end 21 and a second end 22. The second transverse frame end member 30 has a first end 31 and a second end 32. The first longitudinal side member 40 has a first end 41 and a second end 42. The second longitudinal side frame member 50 has a first end 51 and a second end 52. Each of end 21 and 22 is connected to end 41 and 51 respectively each forming a corner 60. Similarly each of end 31 and 32 is connected to end 42 and 52 respectively each forming a corner 60. In this embodiment said ends are connected to each other via a leg receiving portion 61. Each of said ends may be connected to said leg receiving portion 61 via welding or any other suitable manner. Each corner 60 of said pier section 10 is further reinforced with a corner gusset 70, wherein in this embodiment, said corner gusset 70 is triangular in shape wherein one of the legs 71 of the triangle is connected to the end member 20, 30 and the other leg of the triangle 72 is connected to the side member 40, 50. Said section 10 also includes a transverse member 80 running parallel to transverse end members 20, 30. One end 81 of transverse member 80 is connected to side rail 40, and the other end 82 of transverse member 80 is connected to side rail 50.

Figure 19A:
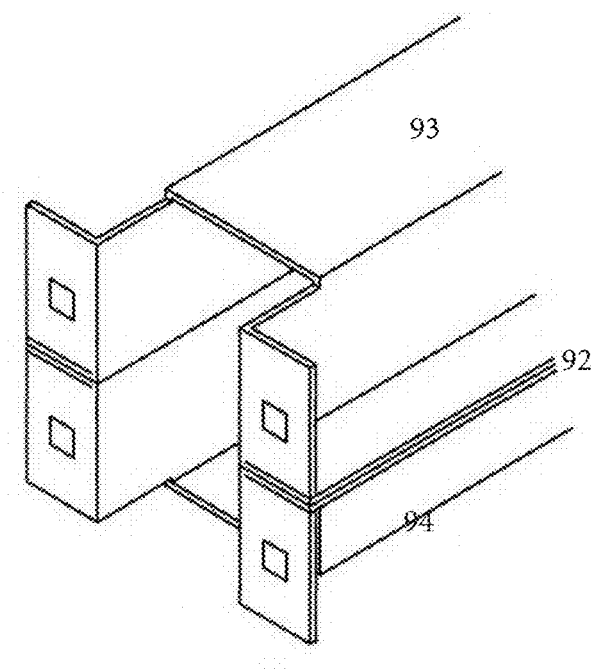
FIG. 19a is a perspective end view of an anti-torsion member according to one embodiment
Figure 19B:
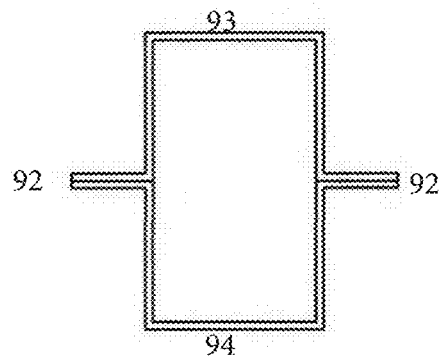
FIG. 19b is a cross sectional end view of an anti-torsion member according to one embodiment

Transverse member 80 provides further structural rigidity to the pier section 10. Pier section 10 also includes a first anti-torsion member 90, and a second anti-torsion member 91, to reduce twisting of said pier section. One end of each anti-torsion member is connected to the end member 20 and 30 respectively. The other end of each anti-torsion member is connected to the transverse member 80 by suitable means including but not limited to bolting, riveting, cleating or the like. Anti-torsion member 90 includes a first key receiver 100 and two second key receivers 101, 102. Anti-torsion member 91 includes two first key receivers 103, 104 and one second key receiver 105. First key receiver 100 and second key receiver 101 form a key receiving pair. Similarly key receiver 102 and 103 form a key receiving pair and key receiver 104 and 105 form a key receiving pair. Anti-torsion member 90, 91 is preferably hollow and substantially square in profile with reinforcement side rails 92 along each side thereof (See FIGS. 19a and 19b). Reinforcement side rails 92 serve to not only connect the elements 93, 94 of the anti-torsion member together, but also further assists in reducing any twisting of the frame.

Figure 3:
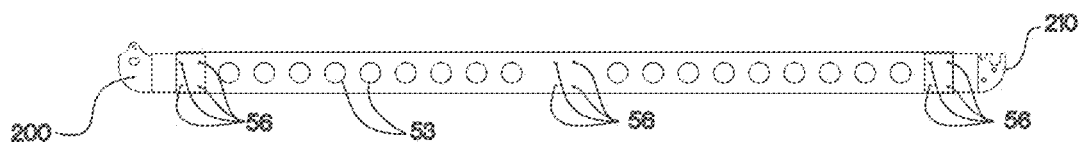
FIG. 3 is a side view of the pier section of FIG. 1

FIG. 3 provides a side view of the section 10 depicting the side rail 50. As can be seen, side rail 50 includes a series of apertures 53 that reduce the weight of the rail 50 as well as increases the strength of the rail 50. Male connector 200 and female connector 210 may also be seen here (described in detail later on). As may also be seen, rail 50 includes a series of apertures 56, to allow for optional connection of female connectors 210, if a second pier section normal to a first pier section is desired.

Figure 3A:
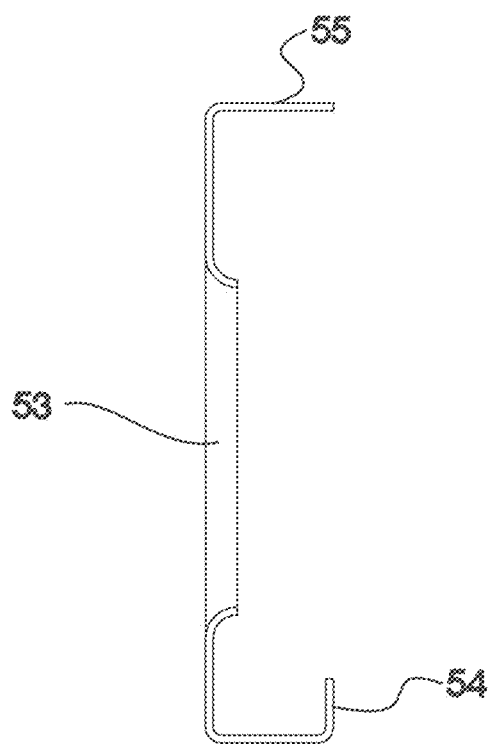
FIG. 3a is a cross sectional view of the side pier section of FIG. 3

FIG. 3A provides a profile view of the side rail 50, in a preferred embodiment. In this case, side rail 50 includes a return bend lower portion 54 and a top portion 55, return bend lower portion 54 provides for increased lateral strength in the side rail 50, and also reduces bounce in the section 10 by adding more material (in tension), to the bottom chord of the side rail 50. Side rail 40, in a preferred embodiment, has the same view as side rail 50 as depicted in FIGS. 3 and 3A.

Figure 4:
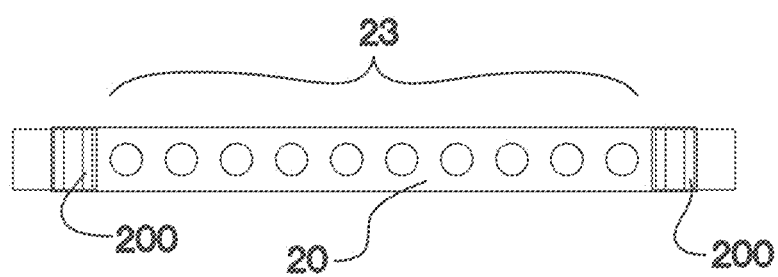
FIG. 4 is an end view of the pier section of FIG. 1
Figure 5:
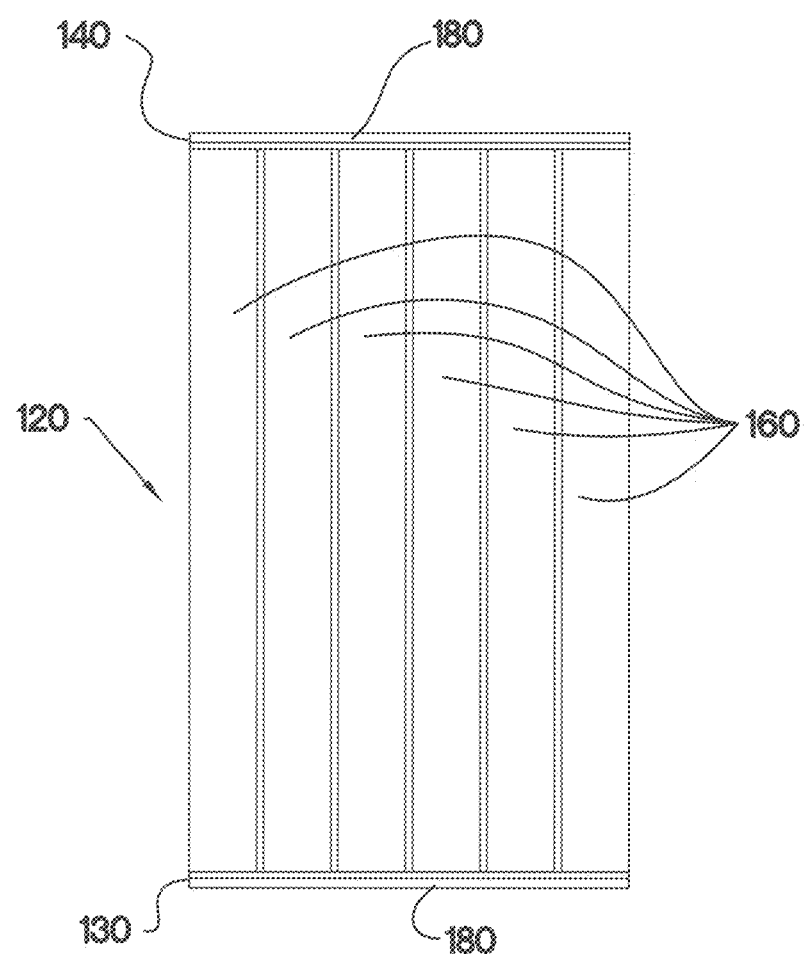
FIG. 5 is a top view of a pier deck panel according to one embodiment
Figure 6:
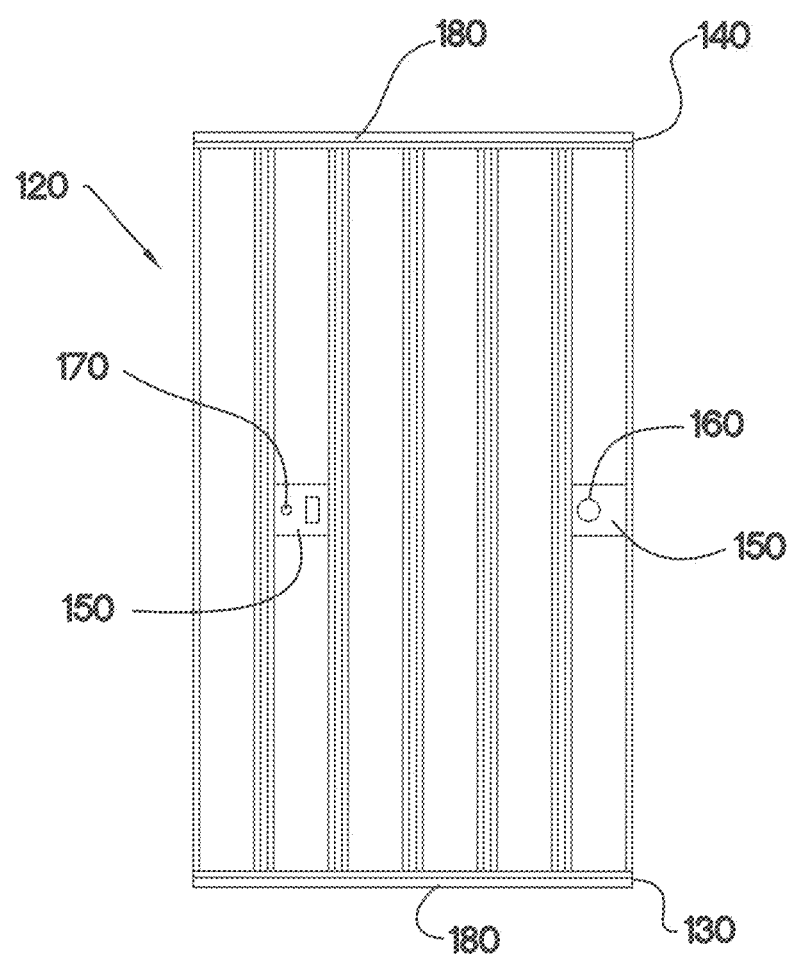
FIG. 6 is a bottom view of the pier deck panel of FIG. 5
Figure 7:
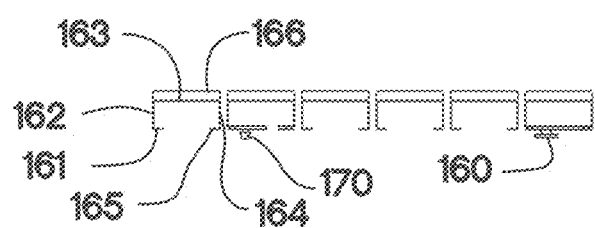
FIG. 7 is a cross sectional side view of the pier deck panel of FIG. 5
Figure 8:
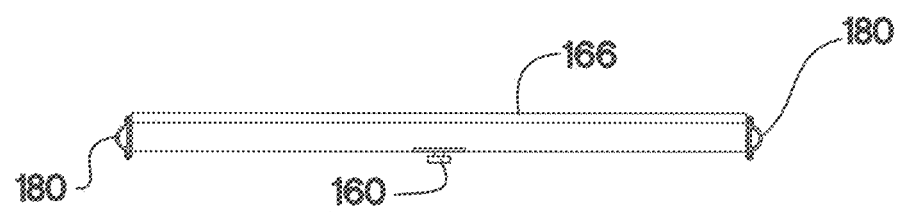
FIG. 8 is an end view of the pier deck panel of FIG. 5

FIG. 4 provides a view of end rail 20. End rail 20 also has a series of apertures 23 that aid in reducing the weight of the end rail 20 and increases the strength thereof. Male connectors 200 are seen as well. End rail 30 has the same view as end rail 20 depicted in FIG. 4 save for one would see female connectors 210 rather than male connectors 200.

Referring now to FIGS. 5-9, a pier deck panel 120 is depicted. In this embodiment, the pier deck panel 120 has a first longitudinal side deck panel member 130, a second longitudinal side deck panel member 140 and two middle longitudinal deck panel members 150, 150'. Each member 130 and 140 extend the length of the pier deck panel 120. Members 130, 140, 150 and 150' support a plurality of spaced apart elongated surface strips 160. Although a plurality of spaced apart elongated surface strips are shown, a single elongated surface strip may also be used. In this embodiment, each surface strip is in the form of an aluminum support with a first end 161 connected to the members 130 and 140, and forming a side 162, followed by a top 163 and a second side 164 terminating at a second end 165 connected to members 130 and 140. In this embodiment, the top of each surface strip includes a wood veneer 166 along the entire surface thereof. The wooden veneer 166 adds to the look and feel of a traditional dock as well as providing a surface to allow users to safely walk thereon. The wood veneer is attached to the top of the surface strip including but not limited to self-tapping screw from underneath, drilling and countersinking from the top, and attaching with bolts and nuts underneath, or the like. Middle longitudinal deck panel member 150' includes a first key 160 and middle longitudinal deck panel member 150 includes a second key 170. The first key 160 and second key 170 are spaced apart the same distance as each of the key receiving pairs discussed above. Key 160 is shaped to fit into key receiver 100, 103 or 104. Key 170 is shaped to fit into key receiver 101, 102 or 105. Deck panel 120 further includes a resilient bumper 180 extending along the length and the outer side of each member 130 and 140. The resilient bumper is made of PVC or the like, preferably UV resistant PVC or the like, serving as a bumper for docking of marine vehicles and minimizing accidental injury to a user.

Figure 9:
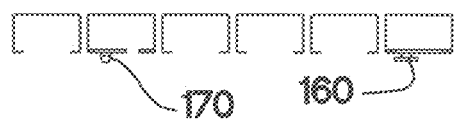
FIG. 9 is a cross sectional side view of a pier deck panel according to another embodiment

Referring now to FIG. 9, a cross sectional side view of a deck panel 120 is shown without the wood veneer 166 on the surface. In this case, the aluminum surface is treated in a manner to result in a safe surface for the user, such as application of an anti-slip coating, traction strips, dimpling, ribbing and combinations thereof.

FIGS. 10a-10d depict an isolated perspective exploded view of the locking hinge pin system 190 when connecting two sections, comprising a male member 200 and a female member 210. Male member 200 includes two spaced apart side panels 201, 202 connected to each other via a first rod member or connector pin 220, and a second rod member or locking pin 230. The connector pin 220 and locking pin 230 are spaced apart from each other, with the connector pin 220 being proximate the end of the male member 200 and the locking pin 230 being proximate the middle of the male member 200. The connector pin 220 is cylindrical in shape. The locking pin 230 is partially cylindrical in shape, preferably a horizontal cylindrical segment in shape, with the cylindrical segment distant said connector pin and the horizontal segment proximate said connector pin. In this configuration, the cylindrical segment surface sits on the surface of the base of the locking pin receiver distributing the weight thereon. In another embodiment, the locking pin is elliptical in shape (not shown).

Figure 10A:
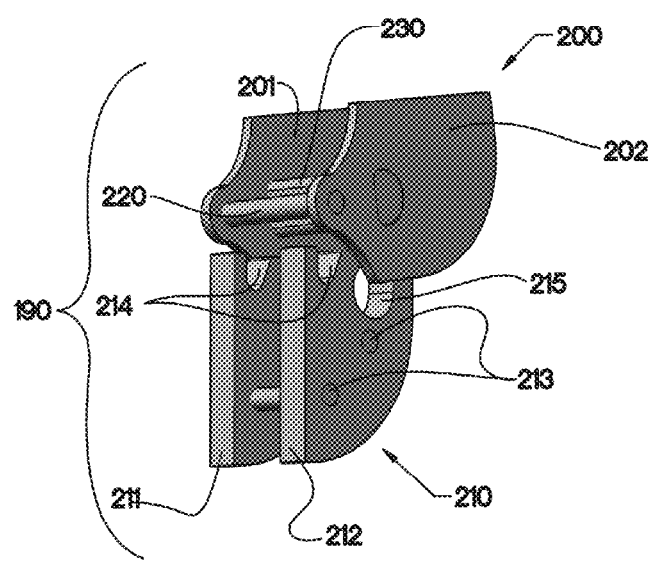
FIGS. 10a-10d depict an isolated view of the locking hinge pin system in sequence according to one embodiment
Figure 10B:
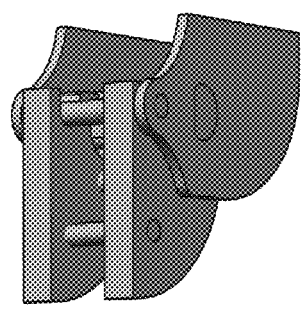
Figure 10C:
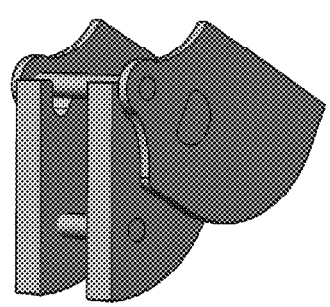
Figure 10D:
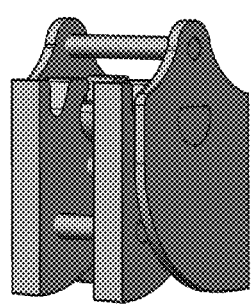
Figure 11A:
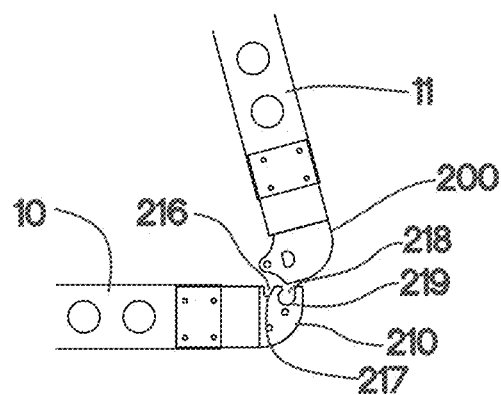
FIGS. 11a-11d depict the sequence of connecting a male connector to a female connector of the locking hinge pin system of FIGS. 10a-10d
FIGS. 12a-12d depict a sequence of installing the pier deck panel of FIG. 5 onto the pier section of FIG. 1
Figure 11B:
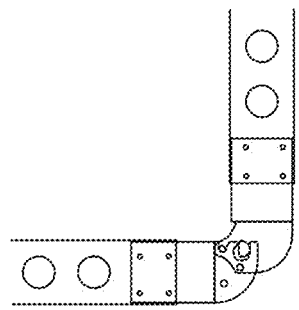
Figure 11C:
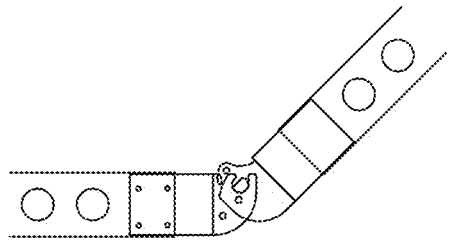
Figure 11D:
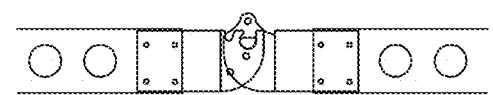

Female member 210 includes two spaced apart side panels 211, 212 connected to each other via two connectors 213. The distance of the two spaced apart side panels 211, 212 is smaller than the distance of the two spaced apart side panels 201, 202, to allow the male member side panels 201, 202 to fit over the female side panels 201, 202, when the male member 200 is connected to the female member 210. The spaced apart side panels of both the male member 200 and female member 210 minimize any debris from the water to be caught therein. Each of the spaced apart side panels 211, 212, include a connector pin receiver 214 for receiving the connector pin 220 and a locking pin receiver 215 for receiving and engaging the locking pin 230. The connector pin receiver 214 is shaped to complement the shape of the connector pin 220. The connector pin receiver 214 has an opening 216 that is wider than the base 217 thereof and assists in guiding the connector pin into the connector pin receiver as best seen in FIGS. 10(b) and 11(b). The locking pin receiver 215 is shaped to complement the shape of the locking pin 230, and to lock the locking pin 230 in place when required. The locking pin receiver 215 has an opening 218 smaller than the diameter of the base 219 of the receiver 215. This locks the locking pin 230 in the female member 210. In particular, as best seen in FIGS. 10(a)-10(d) and 11(a)-(d), when a user wants to connect a pier section 11 to pier section 10 (or a pier section 10 to a shore section), pier section 11 is placed proximate pier section 10 (pier section 10 is placed proximate shore section), and in particular male member 200 is place near female member 210 such that connector pin 220 is aligned with connector pin receiver 214. Connector pin 220 is placed into connector pin receiver 214 and pier 11 (pier 10) is rotated away from pier 10 (shore section) allowing locking pin 230 to initially engage with the locking pin receiver 215. Pier 11 is further rotated away from pier 10 such that connector pin 220 disengages with connector pin receiver 214 and locking pin 230 is fully engaged and locked in the locking pin receiver 215, such that pier 11 (pier 10) is securely engage with pier 10 (shore section) vertically and horizontally. Once locking pin 230 is initially engaged with the locking pin receiver 215, pier 11 may be allowed to freely fall towards the desired position. As can be seen in FIGS. 11(a)-(d), locking pin receiver 215 has an opening that allows the locking pin 230 to fit therein during installation and assembly, but which also restricts the locking pin 230 from being accidentally released from the locking pin receiver 215 when the connected sections are in horizontal alignment. In another embodiment, the connector pin receiver is a V-shape to ease alignment, such that when the weight of the pier section is on the first pin receiver, it centers itself in a matching radius to the first pin, causing the locking pin receiver and locking pin to be aligned for automatic engagement. As the locking pin passes through the opening of the locking pin receiver, the locking pin rotates to create a lock whereby the pier section can only be removed if it is at a right angle to the connected pier section or shore section. The shape of the locking pin allows for the entrance of the locking pin into the locking pin receiver when the male member 200 is overtop the female member 210 when being connected (when a first pier section is about normal to a second pier section), and locking of the locking pin in the locking pin receiver when the male member is fully engaged with the female member (when the first pier section is horizontally engaged with the second pier section) (see FIGS. 10a-10d and 11a-11d).

Figure 12A:
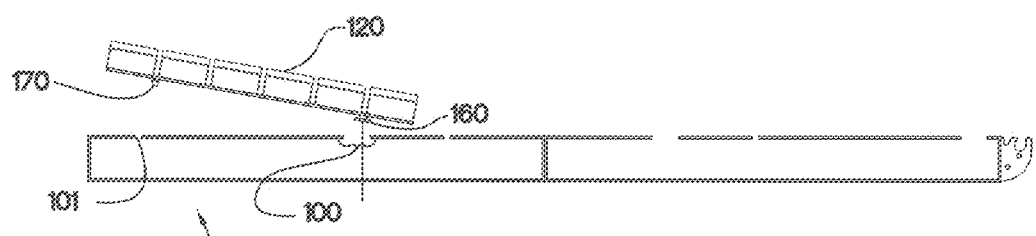
FIG. 12e is an exploded view of the key and key receivers according to one embodiment
Figure 12B:
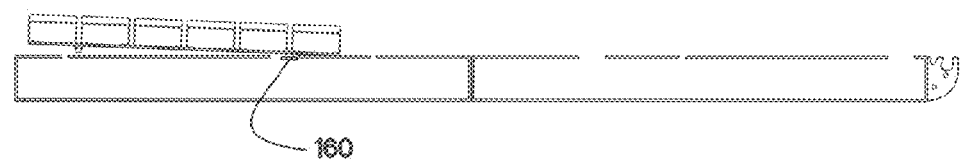
Figure 12C:
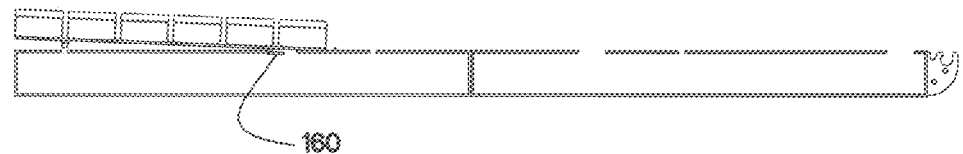
Figure 12D:
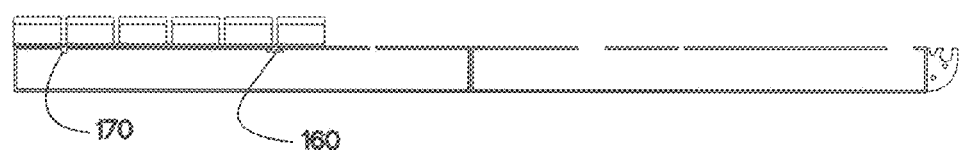
Figure 12E:
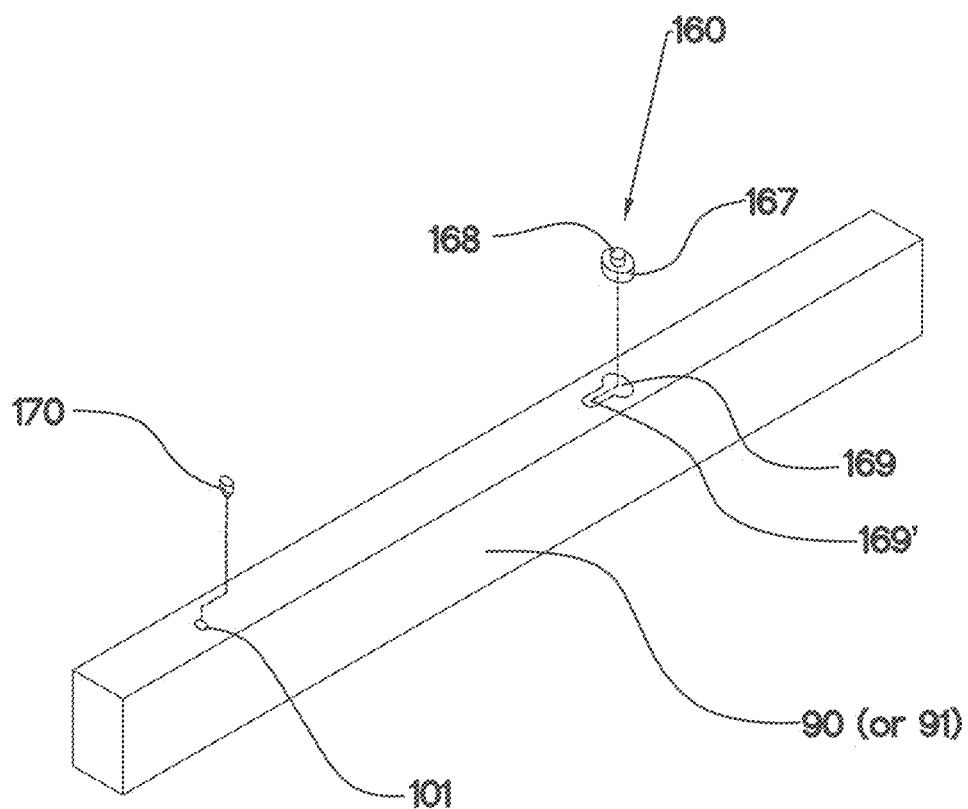

Referring now to FIGS. 12(a)-(d), the sequence of installing a pier deck panel 120 to a pier section 10 is shown. In this embodiment, the pier section 10 allows for three pier deck panels 120 to be installed on the pier section, although less or more pier deck panels may be accommodated depending on the pier section arrangement of key receiving pairs. Pier deck panel 120 is positioned over the desired pier section 10 (or 11) such that key 160 is in line with key receiver 100, and key 170 is in line with key receiver 101. First key 160 is inserted into key receiver 100, and then key 160 is moved along key receiver slot 106 allowing for the insertion of key 170 in key receiver 101. Once both key 160 is in slot 106 and 170 is in key receiver 101, respectively, pier deck panel 120 is securely attached to the desired pier section, minimizing horizontal and vertical movement of said pier deck panel. Similarly, a second pier deck panel (not shown) and a third pier deck panel (not shown) are installed onto the pier section. FIG. 12(e) provides an exploded view of the key 160, detached from the deck panel having a key head of large diameter 167 and a key collar of second small diameter 168. Key receiver 100 is also depicted showing a key head receiver 169 and a key collar slot 169'. When installing a deck panel 120, key head 167 is first inserted into key head receiver 169 until key head 167 is below the top surface of the anti-torsion member 90 (or 91) and the deck panel 120 is then urged towards key receiver 101 such that key collar 168 is engaged in key collar slot 169' and key 170 is inserted into key receiver 101. Now deck panel 120 is secured onto pier section 10 such that lateral, horizontal and vertical movement of the deck panel 120 in relation to the pier section 10 is minimized.

Figure 13:
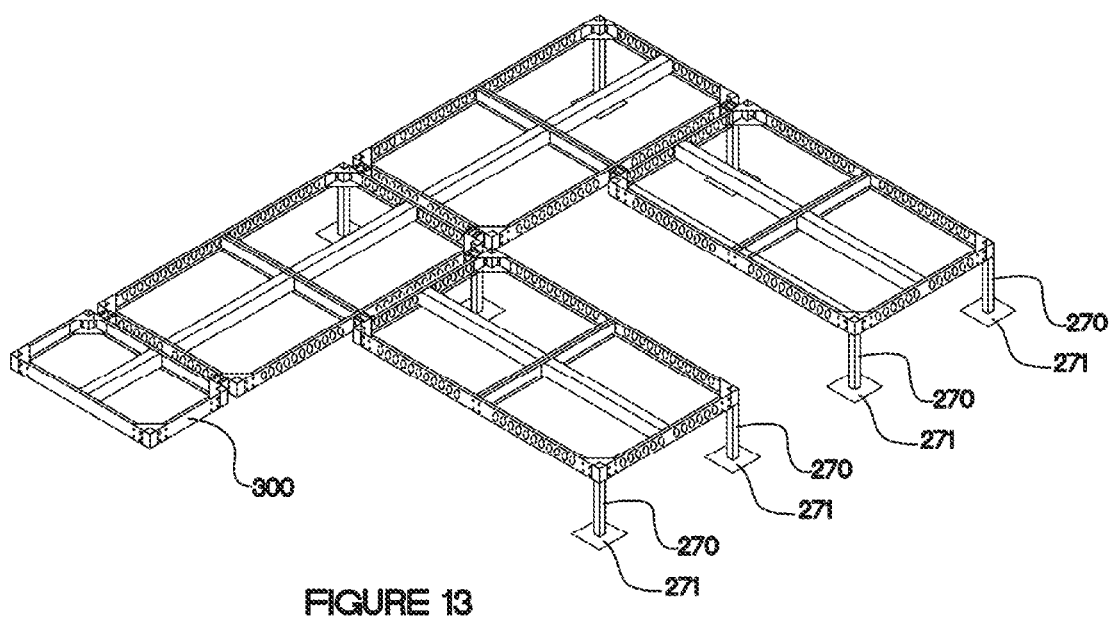
FIG. 13 is a perspective view of the modular pier according to another embodiment
Figure 14:
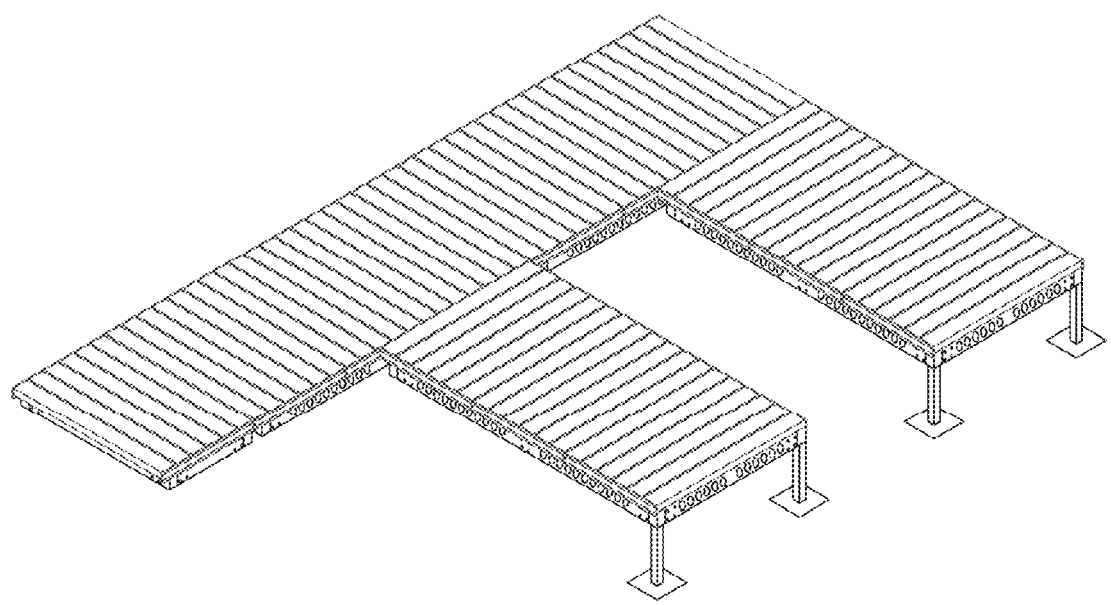
FIG. 14 is a perspective view of the modular pier of FIG. 13 with the deck panels attached

Referring now to FIGS. 13 and 14, there is depicted a modular pier according to the present disclosure with a shore section 300 which may be secured to the shore via pins or equivalent to ensure the shore section remains on the shore. The shore section 300 may be further secured to the shore with the addition of a ballast inside the section, such as cement, limestone, rocks, sand, combinations thereof or the like. Also depicted are pier legs 270 and pier leg bases 271 on the bottom of the body of water. FIG. 14 depicts the modular pier of FIG. 13 with the deck panels secured thereon. As can be seen, pier sections may be extended normal as well as parallel to the shore using the hinge system of the present disclosure as described herein. As may also be seen, the deck panels conceal the hinge system of the connected pier sections, providing a safe pier surface.

Figure 15:
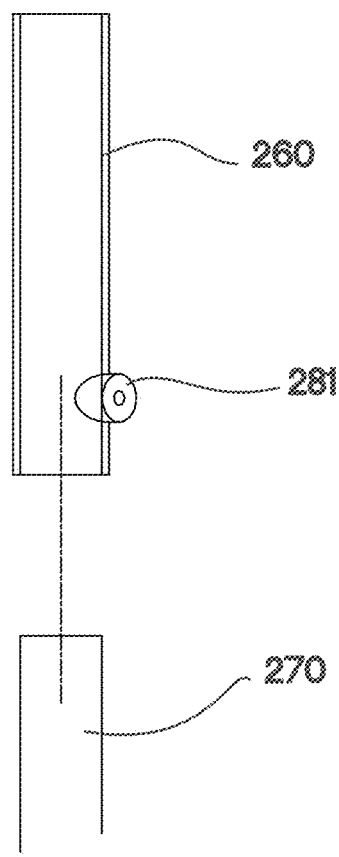
FIG. 15 is a side view of leg connector and leg according to one embodiment
Figure 16:
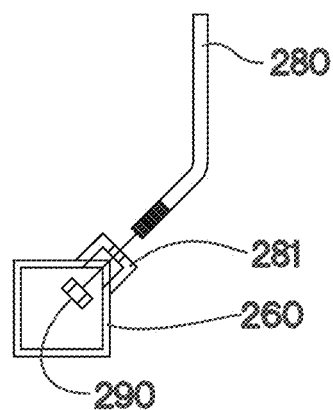
FIG. 16 is a top cut away view of the leg adjuster according to one embodiment

Referring now to FIGS. 15 and 16, there is depicted a pier leg receiver 260 for receiving a pier leg 270. In this embodiment, the pier leg receiver 260 is square shaped to receive a square shaped pier leg 270. The square of the pier leg receiver 260 is larger than the square of the pier leg 270. Once the leg 270 is inserted into the leg receiver 260, clamp screw 280 already in the clamp screw bracket 281 is turned into floating square nut 290 against the leg 270 securing the clamp screw 280 against leg 270 at the desired position. Leg adjustments may be made either in the water or out of the water.

Figure 17:
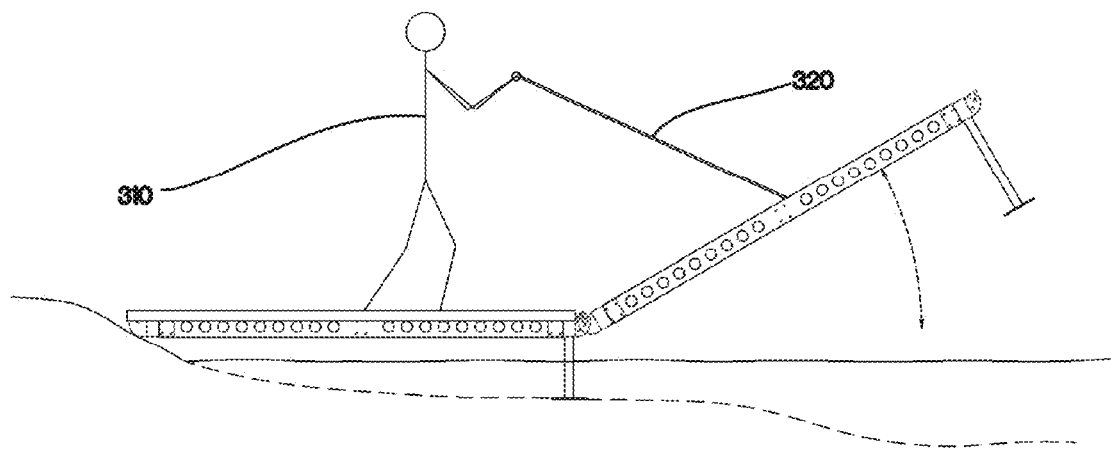
FIG. 17 is a side view of a user removing a pier section from the water
Figure 18:
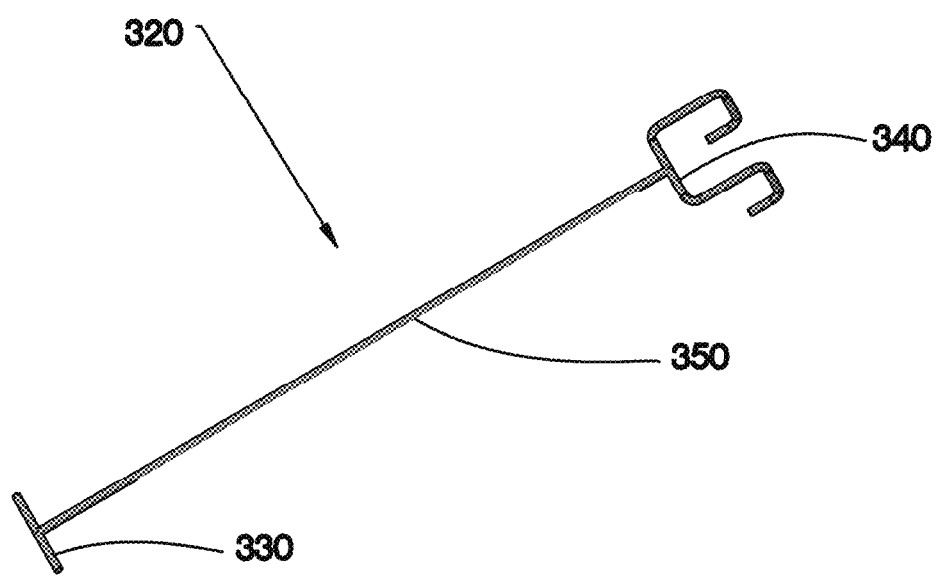
FIG. 18 is a perspective view of a pier tool

Referring now to FIGS. 17 and 18, there is depicted how a user 310, after having removed the deck panels from a pier section, has connected a transverse bar connector 320 to a transverse bar of the pier section, and simply pulls the pier section up causing the pier section to rotate on the female connector, to the point that the male connector may be released from the female connector and the user 310 can carry the pier section away.

Transverse bar connector 320 includes a handle 330 connected to a claw end 340 by a connecting rod 350. The claw end 340 is configured to securely fit over the transverse member allowing for rotation of said pier section in relation to another pier section for ease of manouvering and in particular disassembly. The preferred material of the transverse bar connector is ½ inch diameter steel, or the like.

The preferred material for the pier sections and pier panels is aluminum, or the like, preferably aluminum sheets, stamped, punched and extruded to lighten and add rigidity to the sections and panels.

Preferably, the pier panels are aluminum formed channels wherein the top surface is perforated, powder coated with anti-slip paint for traction, self-adhesive traction strips, dimpling, ridging and combinations thereof, or laminated with wood, composite material and/or stainless steel hardware for traction and aesthetics.

The preferred material for the clamp screw 280 and floating square nut 290 is stainless steel, or the like.

The preferred material for the female member is selected from solid machined aluminum or extruded pieces, preferably anodized, or the like and connected with stainless steel cross pins and hardware or the like.

The preferred material for the male member is selected from anodized aluminum or the like.

As many changes can be made to the preferred embodiment of the invention without departing from the scope thereof; it is intended that all matter contained herein be considered illustrative of the invention and not in a limiting sense.

The invention claimed is:

1. A modular pier comprising:
a shore section, and at least one connectable pier section, wherein each pier section comprises a frame having a top, a bottom, at least one transverse frame member, a first transverse end frame member, a second transverse end frame member, a first longitudinal side frame member and a second longitudinal side frame member, at least one longitudinal anti-torsion member, at least one male connector, attached to said first end of said frame of each pier section; and
at least one female connector, attached to said second end of said frame of each pier section, said at least one male connector comprising a first rod member and a second rod member;
said second rod member being proximate said first rod member and lower than said first rod member in relation to said top of said pier section;
each of said first and second rod member running substantially parallel to said top of said pier section;
said at least one female connector comprising a first receiver for receiving said first rod member and a second receiver for receiving and locking said second rod member;
said second rod member receiver being proximate said first rod member receiver and lower than said first rod member receiver in relation to said top of said pier section;
said first receiver and said second receiver of a first pier section shaped for mating engagement, of said first rod and said second rod respectively of a second pier section;
wherein said first receiver receives said first rod prior to said second receiver receiving and locking said second rod wherein said first rod in said first receiver facilitates maneuvering of said second pier section in relation to said first pier section during assembly and disassembly of said modular pier;
wherein when said at least one connectable pier section is in horizontal alignment said first rod is disengaged from said first receiver.

2. The modular pier of claim 1, wherein said at least one longitudinal anti-torsion member is contained within said frame of said pier section extending between said first transverse end member and said second transverse end member.

3. The modular pier of claim 2, wherein the at least one longitudinal anti-torsion member further comprises at least one deck panel connector receiver for receiving at least one deck panel connector of at least one removable deck panel onto the top of said frame.

4. The modular pier of claim 3, wherein the frame of each pier section further comprises: a corner brace on each corner thereof.

5. The modular pier of claim 4, wherein said corner brace comprises two ends, wherein one end of said corner brace is connected to a transverse side frame member and a second end of said corner brace is connected to a longitudinal frame member.

6. The modular pier of claim 3, wherein the frame of each pier section further comprises:
at least one transverse frame members and at least two anti-torsion members;
wherein a first end of a first anti-torsion member is connected to said first transverse end member, and a second end of said first anti-torsion member is connected to a first transverse frame member, a first end of a second anti-torsion member is connected to said first transverse frame member, and a second end of said second anti-torsion member is connected to said second transverse end member;
said first transverse end member and said second transverse end member defining a deck panel receiving section.

7. The modular pier of claim 6, further comprising a plurality of removable deck panels for receipt on said top of said pier section.

8. The modular pier of claim 7, wherein each deck panel comprises: a top,
bottom, a first side, a second side, a first end, and a second end; wherein said bottom comprises at least one deck panel connector for receipt in said at least one deck panel connector receiver of said at least one anti-torsion member.

9. The modular pier of claim 1, further comprising at least one removable deck panel, for receipt on said top of said pier section.

10. The modular pier of claim 9, wherein each deck panel comprises:
a top, bottom, a first side, a second side, a first end, and a second end;
wherein said bottom comprises at least one deck panel connector for receipt in said at least one deck panel connector receiver of said at least one anti-torsion member.

11. The modular pier of claim 1, further comprising: at least one leg receiver proximate a corner of said pier section, for receiving an adjustable leg.

12. The modular pier of claim 11, wherein the at least one leg receiver further comprises a set screw with handle which locks the leg at a location relative to the leg receiver, wherein the set screw with handle is operable to adjust the height of the leg.

13. The modular pier of claim 1, further comprising:
i) at least a first and second connectable pier section;
ii) at least two transverse frame members;
iii) a plurality of male and female connectors.

14. A method of installing a modular pier having at least one shore section and at least one connectable pier section, the method comprising:

i) securing a shore section to a shore; said shore section having at least one female connector distant said shore, wherein said at least one female connector has a first rod member receiver and a second rod member receiver;

ii) securing at least a first deck panel to said shore section;

iii) connecting at least a first leg to a leg receiver of a first pier section;

iv) connecting said at least first pier section having at least one male connector, to said at least one female connector of said shore section in horizontal alignment;
wherein said at least one male connector further comprises a first rod member and a second rod member, such that when said at least one connectable pier section is in horizontal alignment with said at least one shore section, said first rod member is disengaged from said first rod member receiver;

v) securing at least a first removable deck panel to said at least first pier section;

vi) connecting at least a first leg, to a leg receiver of a second pier section;

vii) connecting said second pier section to said at least first pier section in horizontal alignment; and viii) securing at least a first removable deck panel to said at least second pier section.

15. A hinge system, for connecting a shore section and at least one pier section said hinge system comprising:
a) at least one male connector; and
b) at least one female connector;
wherein when connecting a shore section with at least one pier section, said at least one male connector is on said at least one pier section, and said at least one female connector is on said shore section;
and wherein when connecting a least one pier section with at least another pier section, said at least one male connector is on said at least another pier section, and said at least one female connector is on said at least one pier section;
said at least one male connector further comprising a first rod member and a second rod member;
said second rod member being proximate said first rod member and lower than said first rod member in relation to a top of a shore section and pier section;
each of said first and second rod member running substantially parallel to said top of said pier section;
said at least one female connector comprising a first receiver for receiving said first rod member and a second receiver for receiving and locking said second rod member;
said second rod member receiver being proximate said first rod member receiver and lower than said first rod member receiver;
said first receiver and said second receiver of said shore section shaped for mating engagement of said first rod member and said second rod member respectively of at least one pier section and at least another pier section;
wherein said first receiver receives said first rod member prior to said second receiver receiving and locking said second rod member wherein said first rod in said first receiver facilitates maneuvering of said first pier section in relation to said shore section and said second pier section in relation to said first pier section during assembly and disassembly of said modular pier;
wherein when said at least one pier section is in horizontal alignment with said shore section said first rod member is disengaged from said first receiver.

16. The hinge system of claim 15 for connecting a first pier section with a second pier section.

\* \* \* \* \*